Figure 1:
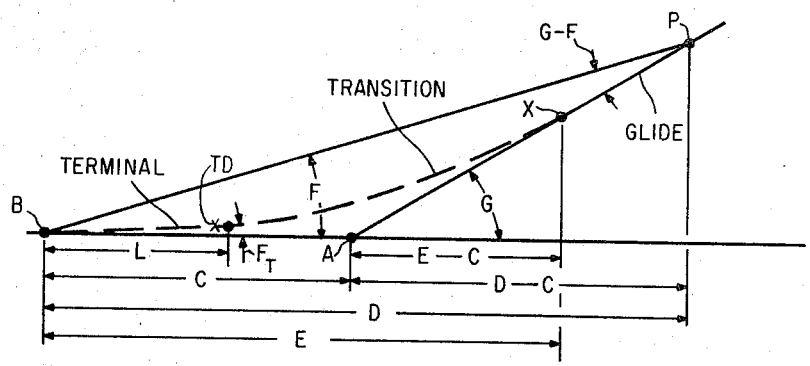

March 14, 1967    A. TATZ ETAL    3,309,707

GUIDANCE COMPUTER FOR AIRCRAFT LANDING SYSTEM

Filed March 2, 1965

INVENTORS
ABRAHAM TATZ
FRANCIS X. KELLY, JR.
BY *Henry Huff*
ATTORNEY 3,309,707
GUIDANCE COMPUTER FOR AIRCRAFT LANDING SYSTEM
Abraham Tatz, Levittown, and Francis X. Kelly, Jr., Huntington, N.Y., assignors to Cutler-Hammer, Inc., Milwaukee, Wis., a corporation of Delaware
Filed Mar. 2, 1965, Ser. No. 436,503
7 Claims. (Cl. 343—108)

This invention relates to instrument landing systems for aircraft, and more particularly to improved airborne apparatus for use with elevation angle information, derived from signals transmitted from a ground station, to guide the aircraft along a desired flight path to a landing. Specifically, the invention relates to an improved type of elevation guidance computer for use in systems wherein the elevation angle of the aircraft from a site beyond the intended touchdown region is measured, and represented continuously on board the aircraft by some characteristic of a signal, for example voltage, that is proportional to or otherwise uniquely related to the measured angle. An aircraft landing system of this type, including angle-measuring equipment and a form of guidance computer, is described in U.S. Patent 3,157,877 issued November 17, 1964, to A. Tatz et al.

The principal object of this invention is to provide elevation guidance computers that are simple and more dependable in construction and operation than prior art devices.

Another object is to provide elevation guidance computers that operate in a single mode, i.e. without mode switching, throughout the entire flight path from initial approach to touchdown.

A further object is to provide apparatus of the above type adapted to use elevation angle information with respect to two sites, one beyond the touchdown region and the other in advance of it.

Another object is to enable guidance of each aircraft along a flight path best suited to its own performance characteristics, all equipped aircraft using the same ground based equipment without interference or need of special adjustment to accommodate individual users.

The foregoing objects are accomplished in accordance with the invention by comparing the elevation angle signal directly with a reference signal which represents the desired flight path, to produce an error signal which is used to direct the aircraft toward the desired path. The value of the reference signal is caused to change as the aircraft progresses inbound toward the runway so as to continuously represent the angular elevation where the aircraft should be in order to remain on the desired path. The value of the reference signal is a function of the distance of the craft from a reference point such as the site beyond the touchdown region. Although the distance could be measured, and used to control or generate the angle reference signal, it is preferred at present to determine the distance by a triangulation involving the measured elevation angle.

Figure 2:
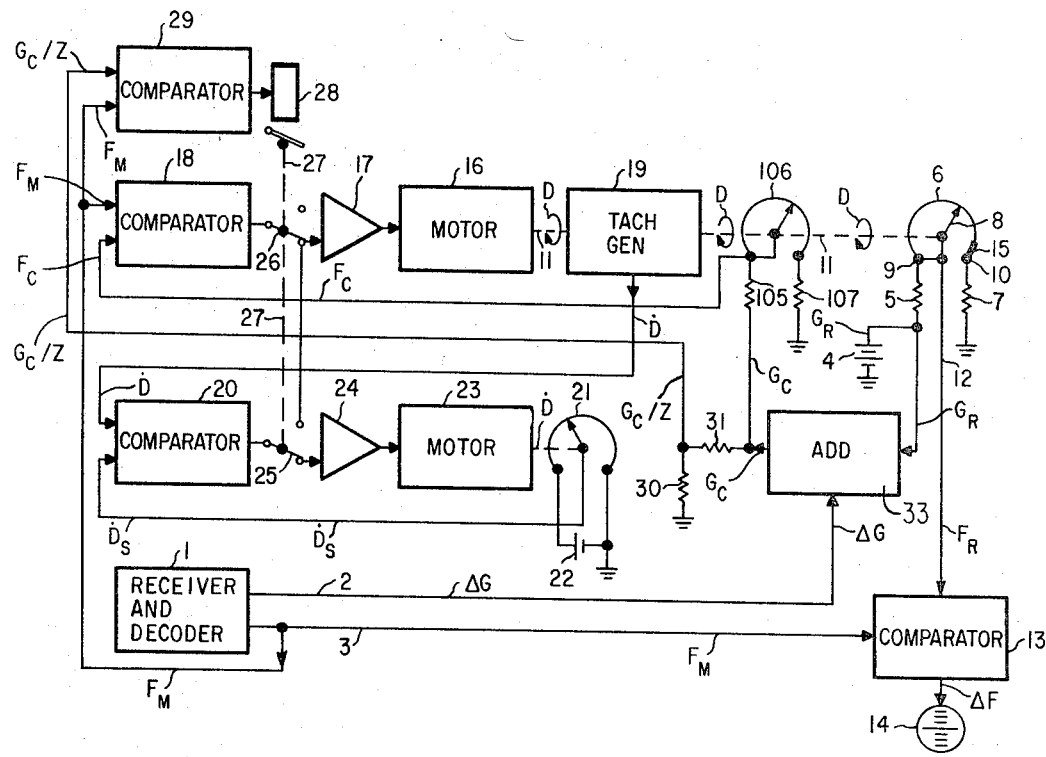

The invention will be described with reference to the accompanying drawing, wherein:

FIG. 1 is a diagram illustrating the geometrical relationships involved in the design and operation of an elevation guidance computer according to the invention, and FIG. 2 is a schematic block diagram of a preferred embodiment of the invention.

Referring to FIG. 1, the horizontal line extending through points A and B represents the intersection between the surface of an airport runway and a vertical plane containing a desired flight path to be followed by an aircraft approaching from a point P. The desired path consists of an initial approach or glide portion directed toward a forward aiming point A, a curved flareout transition portion, shown in dash line, where the flight path angle smoothly decreases, i.e. becomes less steep, and a relatively shallow terminal straight portion, also shown in dash line, directed toward point B. The angle G of the desired glide path is ordinarily about three degrees. This and the other angles indicated in FIG. 1 are shown exaggerated for clarity of illustration. The angle $F_T$ of the terminal portion of the path to the horizontal may be about one half degree.

The intended touchdown point is denoted TD. The point B represents a site beyond the touchdown (in the direction of motion of the aircraft) and for example may be 2500 feet beyond the front aiming point A. Angle F is the elevation angle of the aircraft from the site B. Angles G and $F_T$ are nominally constant; angle F decreases as the craft proceeds throughout the glide and flareout portions of the path, and is constant at $F_T$ during the terminal portion.

The intended touchdown point TD is in advance of site B by a distance that depends upon the height of the point on the aircraft to which the angle F is measured, above the wheels. In a typical situation, the height is that of a radio antenna on the craft, ten feet, for example. With a terminal angle $F_T$ of one-half degree, the distance from TD to B would be about 1200 feet.

Located at or laterally adjacent site B is ground station equipment for transmitting signals that are characteristically modulated or coded in such manner that an aircraft anywhere in the approach zone, and carrying appropriate receiver and decoder equipment, is provided with substantially continuous information as to its own elevation angle F with respect to site B. Suitable ground station and airborne equipment for this purpose is described in detail in the above mentioned Tatz at al. Patent 3,157,877.

Information as to its own distance from the site B, or from a point fixed with respect to site B, is also required on the aircraft. This may be provided by distance measuring equipment, for example of a known type that operates by measurement of round-trip wave propagation time. However, in the presently preferred embodiment of the invention, distance information is obtained by triangulation, using the relationship between the actual values of angles F and G (rather than the on-course values), and the baseline C between sites A and B. This has the advantage of enabling the utilization of presently existing standard ILS glide slope equipment at many airports.

Accordingly, it is assumed for this example that a conventional glide slope transmitter installation is located to one side of the runway, laterally adjacent the forward aiming point A. The glide slope transmitter cooperates in well known manner with receiver equipment on the aircraft to provide an error signal representing the amount and sense of elevational deviation of the craft from a path along line PA in FIG. 1.

Referring to FIG. 2, the aircraft receiver and decoder equipment, whose details form no part of the present invention, are represented as a single unit 1 containing both the ILS receiver and the receiver-decoder apparatus cooperating with the ground transmitter system associated with site B. The unit 1 provides two separate outputs on lines 2 and 3 respectively. For simplicity of explanation, it may be assumed that these outputs are D.-C. voltages, referred to a common ground potential. The voltage on line 2 has a magnitude and sense (positive or negative) that represents any elevation angle deviation of the aircraft below or above the glide path established by the ILS equipment. The voltage on line 3 has a magnitude representing the currently measured value of the elevation angle F indicated in FIG. 1. These voltages, hereinafter referred to as signals $\Delta G$ and $F_M$ respectively, are made to have the same scale factor, say one volt per degree.

A constant voltage source 4 provides a reference signal $G_R$ representing the ILS glide path angle G. Assuming the desired glide angle G to be three degrees, the voltage of source 4 is three volts. The glide path reference signal $G_R$ is applied to a network comprising three resistors 5, 6, and 7 connected in series, as shown. The intermediate resistor 6 is a rheostat, including a movable arm 8 for adjusting or varying the resistance presented between terminals 9 and 10. The arm 8 is mechanically coupled to a shaft 11. The shaft 11 is continuously maintained, by means to be described, at an angle, with respect to a reference position, that is linearly related to the distance D (see FIG. 1) of the aircraft from site B.

The resistors 5, 6 and 7 constitute an adjustable voltage divider providing an output voltage on output lead 12, connected to the movable arm 8, which is related to the input $G_R$ as a function of the position of the arm 8. The voltage on lead 12 is referred to hereinafter as angle reference signal $F_R$, and it is made to vary as a function of the position of shaft 11, in the same manner that the elevation angle F (FIG. 1) of the locus of the desired flight path varies as a function of the distance D.

The angle reference signal $F_R$ and the measured angle signal $F_M$ are applied to a comparator 13, which provides an output $\Delta F = F_R - F_M$. The signal $\Delta F$ corresponds in magnitude and sense to any elevational deviation of the craft from the desired path, and may be displayed on a conventional up-down indicator 14 or otherwise utilized to guide the aircraft.

Returning to FIG. 1, the glide portion of the desired flight path, prior to the point X where the transition portion begins, is a straight line directed toward aiming point A. In accordance with prior art practice, the aircraft is guided in this part of the flight path directly by means of the glide path error signal $\Delta G$. However, this practice requires a "switchover" or change in mode of operation when the point X is reached; control is transferred to entirely different instrumentation, which may result in undesirable control transients at a highly critical stage of the landing maneuver. In the practice of the present invention, the $\Delta G$ signal is not used directly. Instead, the guidance of the aircraft is referred to the angle F throughout the entire operation.

The manner in which the value of the angle reference signal $F_R$ is controlled to represent the desired glide path will now be described. Since the desired glide angle G is small, about three degrees, and angle F is ordinarily smaller, and their difference $G-F$ is still smaller, it can be assumed without appreciable error that the angles are proportional to their tangents, and that slant distances, such as that from P to B, are equal to their horizontal projections, such as D. On this basis, $$\frac{F}{G-F} = \frac{D-C}{C} \tag{1}$$

The above equation shows an angle ratio equalling a distance ratio for the glide portion of the desired flight path.

The same ratio can also be represented by resistances, as follows:

$$\frac{D-C}{C} = \frac{R_6 + R_7}{R_5} \tag{2}$$

where $R_5$, $R_6$ and $R_7$ are the resistances of the resistors, 5, 6 and 7 respectively in FIG. 2. C is a constant, the distance between sites A and B in FIG. 1, and $R_5$ and $R_7$ are constant, as shown in FIG. 2. In the system of FIG. 2, the value of $R_6$ is controlled in accordance with distance to satisfy Equation 2.

Rearranging Equation 2:

$$\frac{D}{C} - 1 = \frac{R_6}{R_5} + \frac{R_7}{R_5} \tag{3}$$

and differentiating with respect to time:

$$\frac{\dot{D}}{C} = \frac{\dot{R}_6}{R_5} \tag{4}$$

and thus:

$$\dot{R}_6 = \dot{D}\left(\frac{R_5}{C}\right) \tag{5}$$

In words, the rate of change of resistance of the rheostat 6 is equal to the rate of change of the distance D times a scale factor $R_5/C$ ohms per foot, i.e. the relationship between distance D and resistance $R_6$ is linear.

Assuming the position of shaft 11 to be linearly related to D, the rheostat 6 is designed to provide a resistance $R_6$ linearly related to the rotation of its arm 8 and shaft 11, throughout the range corresponding to $D > E$, where E (see FIG. 1) is the distance of the beginning of the flare-out transition region (point X) from site B.

Considering now the terminal portion of the desired flight path, where the signal $F_R$ is to be held constant at a value representing the relatively small angle $F_T$ (FIG. 1), it is seen that rotation of shaft 11 should not affect $F_R$ in this region. For this purpose, the final portion 15 traversed by the wiper arm 6, while D is less than the distance L, is short circuited as indicated by the heavy line in FIG. 2. The required value of $F_R$ is obtained by proportioning resistors 5 and 7 as follows:

$$\frac{R_7}{R_5 + R_7} = \frac{V_{F(t)}}{G_R} \tag{6}$$

where $V_{F(t)}$ is a reference voltage whose magnitude is proportional to the magnitude of the angle $F_T$.

In a typical design, the shorted part 10 of the rheostat 6 occupies 10% of the total range of rotation. The initial linear part, effective during the glide portion of the flight path, occupies about 80% of the range. The remaining 10% is the intermediate part traversed by the wiper arm 8 while D decreases from E to L.

The intermediate part of the rheostat is designed with a non-linear resistance-rotation characteristic that tapers smoothly from that of the linear portion to zero, i.e. $dR/d\theta$ is constant in the linear portion, decreases smoothly toward zero in the intermediate portion, and remains at zero throughout the final portion.

The same scale factor, ohms per foot, is used throughout the system wherever a resistance value is used to represent a distance. This scale factor is determined by the condition that the distance E–C in FIG. 1, where the flare-out transition starts, is represented by the particular value of $R_6 + R_7$ at the beginning of the non-linear section of the rheostat. This scale factor is equal to $R_5/C$, as mentioned above.

The voltage divider consisting of resistors 5, 6 and 7 provides the output $F_R$ across resistors 6 and 7 that is related to the voltage $G_R - F_R$ across resistor 5 as follows:

$$\frac{F_R}{G_R - F_R} = \frac{R_6 + R_7}{R_5} \tag{7}$$

Comparison of Equations 2 and 7 shows that $F_R$ is the signal required to represent the angle reference on the straight line glide portion of the desired flight path, as characterized by Equation 1.

The apparatus shown in FIG. 2 for positioning the distance shaft 11 includes a motor 16, an amplifier 17, a comparator 18, and a voltage divider network consisting of resistors 105, 106 and 107. Resistors 105, 106 and 107 may be identical to resistors 5, 6 and 7, although, as will be seen, only certain similarities are essential. The input to the network is a signal $G_C$, representing the actual elevation angle of the aircraft from site A, instead of the nominal glide path elevation angle $G_R$. The signal $G_C$ is provided by an adding network 33, which is supplied with $G_R$ and $\Delta G$, as indicated. The output $G_C$ is simply the algebraic sum of the two inputs.

The output of the voltage divider 105, 106, 107 is a signal $F_C$, representing the value the angle F would have, if the shaft 11 were in the correct position corresponding to the actual value of $F_M$. $F_C$ is compared with $F_M$ in comparator 18. Any difference between the two produces an error signal which is amplified by amplifier 17 and supplied to the motor 16, energizing it to drive the shaft 11 to the correct position.

This operation continues, taking into account any variations in $F_M$ and $G_C$, during the major part of the progress of the aircraft in the glide portion of the flight path. However, when the aircraft departs substantially from the glide path after passing point X, the ILS transmissions will no longer be received and signal $\Delta G$ will not be available. Subsequent computation of distance for positioning shaft 11 is an extrapolation based on the assumption that the speed of the aircraft remains approximately constant during the remainder of the flight.

A tachometer generator 19 driven by shaft 11 provides an output signal representing the speed at which shaft 11 rotates. This signal, denoted $\dot{D}$, represents the rate of change of distance D, and is applied to a comparator 20. Also applied to the comparator 20 is a signal $\dot{D}_S$, produced by a variable voltage divider 21 connected across a constant voltage source 22. A motor 23 is arranged to rotate the movable arm of the voltage divider 21, in response to energization from an amplifier 24.

The output of comparator 20 is an error signal representing any difference between $\dot{D}$ and $\dot{D}_S$, and is applied to the amplifier 24 through a switch 25 when the switch is in the position shown. A similar switch 26, between comparator 18 and amplifier 17, is also closed when in the lower position as shown.

Switches 25 and 26 are mechanically coupled, as indicated by dash line 27, for transfer to their upper positions by an actuator 28. Actuator 28 is connected to be energized by the output of a comparator 29. The comparator 29 is provided with two inputs: the signal $F_M$, and a signal $G_{C/Z}$ obtained from a voltage divider 30, 31 supplied with the signal $G_C$. Resistors 30 and 31 are proportioned to make Z equal to the ratio G/F existing at or just prior to the arrival of the aircraft at point X. The comparator 29 and actuator 28 are designed in known manner to make the actuator operate to its upper position when input signal $F_M$ becomes less than the signal $G_{C/Z}$.

During the glide, switch 25 is in its lower position, and motor 23 is energized as necessary to adjust the voltage divider 21 to maintain $\dot{D}_S$ equal to $\dot{D}$. When the aircraft reaches the point X, or near X, where $F_M$ becomes less than $G_{C/Z}$, switches 25 and 26 are moved to their upper positions, disconnecting comparators 18 and 20 from amplifiers 17 and 24 respectively, and connecting comparator 20 to amplifier 17. Motor 23 is de-energized, leaving the voltage divider 21 at the position to which it was last adjusted. $\dot{D}_S$ thus represents a "stored" value of the speed of the aircraft upon its arrival at or near point X. Motor 16 is now energized, in response to the output of comparator 20, to run continuously at a speed such that the output $\dot{D}$ of the tachometer generator 19 is substantially equal to $\dot{D}_S$. As a result, the distance shaft continues to rotate as it would if the distance were still being computed as in the glide, and the aircraft speed remained constant.

Since the voltage divider 105, 106, 107 is not used during the flareout transition and terminal portions of the operation, the rheostat 106 need not include a non-linear region. The final 20 percent of its range may be short circuited, and the resistors 105 and 107 are made to have resistances representing distances C and E-C respectively in accordance with the previously established scale factor of ohms per foot.

If it is desired to measure the second elevation angle $G_C$ from a site that is beyond the forward aiming point A, as in one of the modifications described in said Tatz et al. Patent 3,157,877, the distance between the transmitter sites would be less than C, say C′, and resistors 105 and 107 would have values proportional to C′ and E-C′ respectively.

We claim:
1. Aircraft apparatus for use in an aircraft landing system wherein first and second signals are produced on an aircraft representing respectively the elevation angle of the craft with respect to a site adjacent a runway and beyond the intended touchdown region, and the distance of the aircraft from a reference point fixed with respect to said site, to guide the aircraft along a flight path having an initial portion directed toward a forward aiming point in advance of said touchdown region, a final portion directed toward said site at a relatively shallow terminal elevation angle, and an intermediate transition flareout portion, comprising:
   (a) a source of voltage representing the elevation angle of the initial glide slope portion of a desired flight path,
   (b) a voltage divider connected to said source, comprising first, second and third resistors connected in series, said second resistor being a rheostat with a movable element for varying its resistance,
   (c) means responsive to said second signal for moving said movable element in a linear relationship to said distance,
   (d) the resistance of said rheostat being related to the position of said movable element linearly throughout a range corresponding to said initial glide path portion of said desired flight path, non-linearly related to said position in a smoothly tapered manner throughout a range corresponding to the flareout transition region of said desired flight path, said resistance being zero throughout a range corresponding to the terminal portion of said desired flight path,
   (e) the resistance value of said first resistor and said third resistor satisfying two conditions, one condition being that the ratio of the resistance of the third resistor to the resistance sum of the first and third resistors is equal to the ratio of the terminal elevation angle of the final portion to said elevation angle of said initial portion of the desired flight path; the other condition being that the ratio of the resistance sum of the third resistor and the non-linear portion of the rheostat to the resistance of the first resistor is equal to the ratio of the distance between the start of the transition portion and the forward aiming point to the distance from the forward aiming point to the site from which said first signal is measured, and
   (f) means for comparing said first signal, representing elevation angle, to the output of said voltage divider to produce a difference error signal that represents the amount and sense of deviation of the aircraft from said desired flight path.

2. The invention set forth in claim 1, wherein said means responsive to said second signal for positioning said movable element comprises:
   (a) means for producing a voltage representing a second elevation angle of the aircraft with respect to a point that is at or beyond said forward aiming point,
   (b) a second voltage divider comprising fourth, fifth and sixth resistors connected in series, said fifth resistor being a rheostat aligned with said first mentioned rheostat and provided with a movable element for varying its resistance, said movable element being mechanically coupled to that of the first mentioned rheostat, (c) means for applying said voltage, representing said second elevation angle, to said second voltage divider, (d) servo motor means for moving the movable element of said fifth resistor, (e) means differentially responsive to the output of said second voltage divider and said first signal representing the elevation angle of the aircraft from the site beyond the intended touchdown region to produce an error signal, (f) means responsive to said error signal to operate said servo motor means, (g) the resistance of said fifth resistor being linearly related to the position of its movable element throughout the range that is aligned with the linear portion of said first mentioned rheostat, and zero throughout the range that is aligned with the non-linear and zero resistance portions of said first mentioned rheostat, (h) the ratio of the resistance of said fourth resistor to the resistance of said first resistor being equal to the ratio of the distance between the two angle measurement sites to the distance from said forward aiming point to the site from which said first elevation angle is measured, (i) the ratio of the resistance of said sixth resistor to the resistance sum of said third resistor and the non-linear portion of said first rheostat being equal to the ratio of the distance between the start of the transition portion of the desired flight path and said point from which said second elevation angle is measured to the distance between the start of said transition portion and said forward aiming point.

3. The invention set forth in claim 2, further comprising:

(a) means for producing a speed voltage representing the speed of said servo motor, (b) means for storing said speed voltage and (c) means for producing a second error signal as the difference between the speed voltage and the stored value of speed voltage, (d) switching means for switching the error signal, to which said servo motor is responsive, from said first error signal to said second error signal so that after the switching the servo motor continues to turn at the same speed it had before switchover, (e) means for selecting the distance of occurrence of said switching by comparing said first signal representing elevation angle with a predetermined fraction of said signal representing a second elevation angle.

4. Apparatus for use in an aircraft landing system comprising:

(a) means for producing a first signal representing the distance of the aircraft from a reference point that is in advance of a site located beyond an intended touchdown region, (b) means for producing a second signal representing a desired elevation angle from a point in advance of said touchdown region, (c) a resistor network comprised of first and second resistors each having one end respectively connected to first and second ends of a rheostat that includes a movable contact and at least two adjoining resistive portions, the first resistive portion, connected to the first end of the rheostat, providing the highest resistance values which vary linearly as a function of movement of the movable contact and the second resistive portion providing progressively lower resistance values which vary non-linearly as a function of the movement of said movable contact, (d) means for varying the position of the movable contact as a function of said first signal, (e) means coupling said second signal to the other end of said first resistor to provide at the movable contact of said rheostat a desired elevation angle signal representing a desired flight path to be followed by the aircraft to said touchdown region.

5. In a computer for use in an aircraft guidance system the combination comprising:

(a) means providing a first signal representing the actual elevation angle of an aircraft from a forward aiming point in advance of an intended touchdown region, (b) means providing a second signal representing the actual elevation angle of the aircraft from a site beyond said touchdown region, (c) a resistor network including at least a fixed-value resistor connected at one end to a rheostat having a linearly variable resistance portion, (d) means for applying said first signal to the other end of said fixed-value resistor to apply current through said resistor network, (e) the resistance values in said resistance network being proportioned according to the relationship $$\frac{F}{G-F} = \frac{D-C}{C}$$

where G and F respectively correspond to said first and second signals, C is the distance between said point and said site and is represented by the fixed-value resistor, while $D-C$ is the distance of the aircraft from said point and is represented by the resistance value of said variable portion, (f) means for comparing said second signal with a third signal derived from a movable contact on said rheostat to produce an error signal, (g) motor means responsive to said error signal to move said movable contact on the rheostat to cause said third signal to equal said second signal, (h) whereby the resistance value remaining in the rheostat corresponds to the distance of the aircraft from said point, (i) a second resistor network including at least second ($R_5$) and third ($R_7$) fixed-value resistors connected respectively on opposite sides of a second rheostat ($R_6$), (j) said second rheostat including at least a first resistance portion whose resistance value is linearly variable as a function of the movement of a movable contact and a second portion whose resistance values are less than those of the first portion and vary non-linearly as a function of the position of said movable contact, (k) the resistance values of said second resistor network being proportioned over the linearly variable portion of rheostat $R_6$ according to the relationship $$\frac{D-C}{C} = \frac{R_6 + R_7}{R_5}$$

(l) means providing a fourth signal representing an elevation angle from said point along which it is desired that the aircraft should fly toward the forward aiming point, (m) means coupling said fourth signal to the free end of said second fixed-value resistor to apply current through said second resistor network, (n) means for positioning the movable contact on the second rheostat to a position corresponding to the position of the movable contact on said first rheostat, and (o) means for deriving a signal from the movable contact of said second rheostat, this signal representing the desired elevation angle from said site for the aircraft at its distance from said site and in the desired flight path.

6. The combination claimed in claim 5, wherein the resistance value of said third fixed-value resistor is proportioned to provide a fixed-value signal from the movable contact of the second rheostat which if equalled by said second signal will place the aircraft in contact with the ground when the aircraft is substantially at said touchdown region.

7. The combination claimed in claim 5 and further including:
(a) means operable in response to said motor means for deriving a signal representing the rate of change of the distance of the aircraft from said point,
(b) means for producing a switching signal when the value of said second signal decreases to a predetermined value,
(c) means operable in response to said switching signal to move the movable contact of said first rheostat at a speed corresponding to the rate of change of distance of said aircraft from said point at the time of occurrence of said switching signal.

References Cited by the Examiner
UNITED STATES PATENTS

| 3,169,730 | 2/1965 | Gaylor et al. | 343—108 |
| 3,189,904 | 6/1965 | Tatz | 343—108 |
| 3,191,175 | 6/1965 | Battle et al. | 343—108 |
| 3,210,763 | 10/1965 | Thomson | 343—108 |
| 3,266,039 | 8/1966 | Sylvander | 343—108 |

References Cited by the Applicant
UNITED STATES PATENTS

| 2,664,560 | 12/1953 | Lyman et al. |
| 3,157,877 | 11/1964 | Tatz et al. |

CHESTER L. JUSTUS, *Primary Examiner.*

H. C. WAMSLEY, *Assistant Examiner.*